(12) United States Patent
Alequin

(10) Patent No.: US 10,800,433 B2
(45) Date of Patent: Oct. 13, 2020

(54) SEAT HAPTIC SYSTEM AND METHOD OF EQUALIZING HAPTIC OUTPUT

(71) Applicant: Honda Motor Co., Ltd., Tokyo (JP)

(72) Inventor: Joseph Anthony Alequin, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 98 days.

(21) Appl. No.: 16/131,865

(22) Filed: Sep. 14, 2018

(65) Prior Publication Data

US 2020/0086892 A1  Mar. 19, 2020

(51) Int. Cl.
| | |
|---|---|
| *B60Q 9/00* | (2006.01) |
| *B60W 50/16* | (2020.01) |
| *G06F 3/01* | (2006.01) |
| *G06F 3/16* | (2006.01) |
| *B60W 50/14* | (2020.01) |
| *B60N 2/64* | (2006.01) |

(52) U.S. Cl.
CPC .............. *B60W 50/16* (2013.01); *B60Q 9/00* (2013.01); *G06F 3/016* (2013.01); *G06F 3/165* (2013.01); *G06F 3/167* (2013.01); *B60N 2/64* (2013.01); *B60W 2050/146* (2013.01)

(58) Field of Classification Search
CPC .......... G06F 3/016; G06F 3/165; G06F 3/167; B60W 50/16; B60W 2050/146; B60Q 9/00; B60N 2/64
USPC ....................................................... 715/702
See application file for complete search history.

(56) References Cited

U.S. PATENT DOCUMENTS

| | | | | |
|---|---|---|---|---|
| 4,641,344 | A * | 2/1987 | Kasai ................... | H03G 3/3005 381/57 |
| 5,034,984 | A * | 7/1991 | Bose ....................... | H03G 3/32 381/107 |
| 5,684,722 | A | 11/1997 | Thorner et al. | |
| 6,169,807 | B1 * | 1/2001 | Sansur .................... | H03G 3/32 381/107 |
| 7,110,558 | B1 * | 9/2006 | Elliott ..................... | H03G 3/32 381/104 |
| 7,623,114 | B2 * | 11/2009 | Rank .................... | A63F 13/5255 345/156 |
| 7,765,333 | B2 | 7/2010 | Cruz-Hernandez et al. | |
| 8,378,964 | B2 | 2/2013 | Ullrich et al. | |
| 9,164,587 | B2 | 10/2015 | Da Coasta et al. | |
| 9,507,423 | B2 | 11/2016 | Gandhi et al. | |
| 9,619,029 | B2 | 4/2017 | Lacroix et al. | |

(Continued)

*Primary Examiner* — Scott T Baderman
*Assistant Examiner* — Hassan Mrabi
(74) *Attorney, Agent, or Firm* — Armstrong Teasdale LLP

(57) ABSTRACT

A seat haptic system includes a seat comprising a plurality of actuators configured to generate a haptic output, and a controller communicatively coupled to the plurality of actuators. The controller is configured to receive a first input signal associated with first audio content at a first volume level, and control the plurality of actuators to generate a first haptic output based on the first audio content, the first haptic output having a first magnitude associated with the first volume level of the first audio content. The controller is further configured to receive a second input signal associated with second audio content at a second volume level different from the first volume level, and control the plurality of actuators to generate a transitional haptic output based on a difference between the first volume level and the second volume level.

18 Claims, 9 Drawing Sheets

(56) References Cited

U.S. PATENT DOCUMENTS

| | | |
|---|---|---|
| 9,640,047 B2 | 5/2017 | Choi et al. |
| 9,818,272 B2 | 11/2017 | Wang et al. |
| 9,984,539 B2 * | 5/2018 | Moussette ............... G06F 3/167 |
| 2009/0069081 A1 * | 3/2009 | Thorner ................... G06F 3/011 463/30 |
| 2015/0061895 A1 * | 3/2015 | Ricci ....................... G06F 16/25 340/902 |
| 2016/0276994 A1 * | 9/2016 | Yagi ......................... H03G 5/16 |
| 2017/0011602 A1 | 1/2017 | Brav et al. |
| 2017/0098350 A1 | 4/2017 | Ebeling et al. |
| 2017/0154533 A1 * | 6/2017 | Illy ....................... B60W 50/14 |
| 2017/0291543 A1 * | 10/2017 | Goldman-Shenhar ... B60Q 9/00 |
| 2018/0194369 A1 * | 7/2018 | Lisseman ............... B62D 1/046 |

* cited by examiner

SEAT HAPTIC SYSTEM AND METHOD OF EQUALIZING HAPTIC OUTPUT

BACKGROUND

The field of the disclosure relates generally to haptic systems and, more particularly, to seat haptic systems.

Haptic output systems are designed to communicate information to a person via the person's sense of touch. Haptic output systems are used in a wide variety of industries, including user computing device technology (e.g., haptic systems in smartphones) and in automotive technology. For example, in the automotive industry, haptic technology is implemented in user interfaces as well as in other vehicle components (e.g., vehicle seats and steering wheels) to impart information to, for example, a driver.

Many known haptic systems generate haptic output associated with an audio output from an entertainment system. In at least some implementations, an intensity of the haptic output is directly associated with a volume level of the audio output, such that, as the volume of the audio output is increased, the intensity of the haptic output is correspondingly increased. In addition, if the difference between a volume level of first audio content (e.g., a first song) and a volume level of second audio content (e.g., a second song) is very high, the intensity between a first haptic output associated with the first audio content and a second haptic output associated with the second audio content will be proportionately high, which can be uncomfortable or startling.

BRIEF DESCRIPTION

In one aspect, a seat haptic system includes a seat and a controller. The seat includes a plurality of actuators configured to generate a haptic output, and the controller is communicatively coupled to the plurality of actuators. The controller is configured to receive a first input signal associated with first audio content at a first volume level, and to control the plurality of actuators to generate a first haptic output based on the first audio content. The first haptic output has a first magnitude associated with the first volume level of the first audio content. The controller is also configured to receive a second input signal associated with second audio content at a second volume level different from the first volume level, and to control the plurality of actuators to generate a transitional haptic output based on a difference between the first volume level and the second volume level.

In another aspect, a vehicle haptic system includes a plurality of actuators configured to generate a haptic output, and a controller communicatively coupled to the plurality of actuators. The controller is configured to receive a first input signal associated with first audio content at a first volume level, and to control the plurality of actuators to generate a first haptic output based on the first audio content. The first haptic output has a first magnitude associated with the first volume level of the first audio content. The controller is also configured to receive a second input signal associated with second audio content at a second volume level different from the first volume level, and to control the plurality of actuators to generate a transitional haptic output based on a difference between the first volume level and the second volume level.

In yet another aspect, a method of generating a haptic output includes positioning a plurality of actuators in a seat, receiving, by a controller communicatively coupled to the plurality of actuators, a first input signal associated with first audio content at a first volume level, and controlling, by the controller, the plurality of actuators to generate a first haptic output based on the first audio content. The first haptic output has a first magnitude associated with the first volume level of the first audio content. The method also includes receiving, by the controller, a second input signal associated with second audio content at a second volume level different from the first volume level, and controlling, by the controller, the plurality of actuators to generate a transitional haptic output based on a difference between the first volume level and the second volume level.

DETAILED DESCRIPTION

Figure 1:
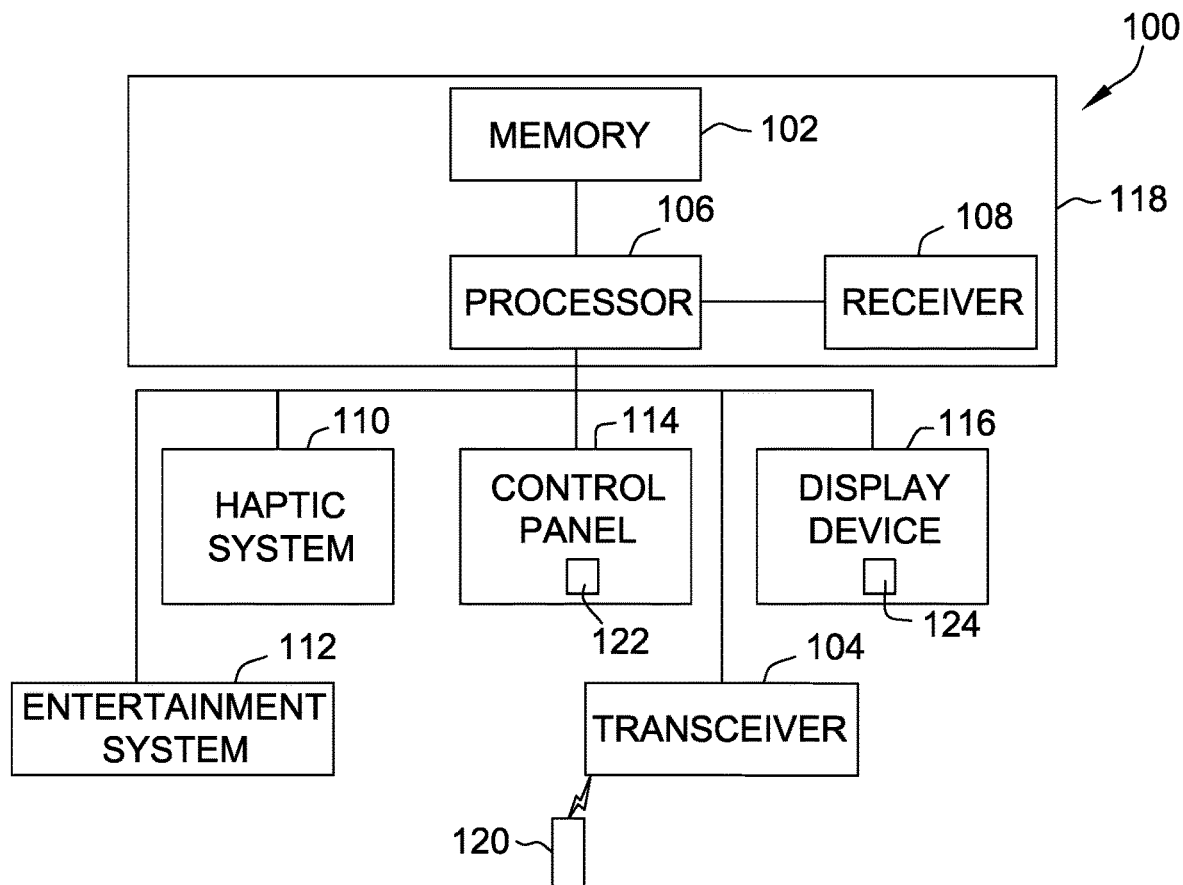
FIG. 1 is a block diagram of an exemplary vehicle control system.

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., systems, devices, processors, controllers, or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

Various embodiments of methods and systems for controlling functions of a vehicle control system, including a seat haptic system, are provided. It should be noted that although the various embodiments are described in connection with the automotive industry, such as for use with an automobile, one or more embodiments may be implemented in different industries and/or for different applications. Additionally, communication of information used in accordance with one or more embodiments may be performed with different types of communication protocols, as well as using different types of communication lines and communication buses.

FIG. 1 is a block diagram of an exemplary vehicle control system 100. In the exemplary embodiment, the vehicle control system 100 includes a memory 102, a transceiver 104, a processor 106, a receiver 108, a seat haptic system 110, a vehicle entertainment system 112, a control panel 114, and a display device 116. In some embodiments, the memory 102, the transceiver 104, the processor 106, and/or the receiver 108 may be included in a computing device, such as a controller 118 for the system 100, which may control or otherwise be communicatively coupled to any other component of the system 100 (e.g., the seat haptic system 110, the vehicle entertainment system 112, the control panel 114, and/or the display device 116).

The processor 106 may include one or more conventional electronic processors that interpret and execute instructions. The memory 102 may include a random access memory (RAM), a read-only memory (ROM), and/or another type of dynamic or static storage device that stores information and instructions for execution by the processor 106. The RAM, or another type of dynamic storage device, may store instructions as well as temporary variables or other intermediate information used during execution of instructions by the processor 106. The ROM, or another type of static storage device, may store static information and instructions for the processor 106.

The transceiver 104 may communicate with the processor 106 via a communication line, and may communicate wirelessly or via a wired connection with a portable device 120. The portable device 120 may include a mobile phone or other communication device. In some embodiments, the transceiver 104 may communicate wirelessly with the portable device 120 via a Bluetooth® protocol (Bluetooth is a registered trademark of Bluetooth Sig., Inc. of Bellevue, Wash.). In other embodiments, another wireless protocol may be used. In some embodiments, the transceiver 104 may be included as part of the controller 118.

The seat haptic system 110 may communicate with the processor 106 via a communication line to transmit data to/from the seat haptic system 110, such as for control of components of the seat haptic system 110 as described further herein. The seat haptic system 110 includes one or more vehicle seats of the vehicle and may be considered to include the controller 118, inasmuch as the controller 118 receives data from and/or transmits data (including control signals) to one or more components at the vehicle seats. In some embodiments, controller 118 or components thereof may be incorporated into one or more of the vehicle seats.

The vehicle entertainment system 112 may include one or more speakers for playing audio content, as well as one or more controls for controlling audio output from one or more of the speakers, in response to audio input signals. Audio input signals associated with the audio content may be received from, for example, a portable device 120 or from other components of vehicle entertainment system, such as a radio, television, satellite receiver, etc. The vehicle entertainment system 112, in some embodiments, includes a rear entertainment system, such that passengers at a rear passenger location of a vehicle (e.g., vehicle 300, shown in FIG. 3) may be entertained. The rear entertainment system may include a display screen for displaying video or picture content in combination with audio content, and one or more speakers located at one or more rear passenger locations of the vehicle to play the audio content. In some such embodiments, the audio content delivered using the rear entertainment system is different from audio content delivered to a front portion of the vehicle corresponding to a driver of the vehicle and/or a front passenger.

The control panel 114 may communicate with the processor 106 via a communication line to transmit data to/from the control panel 114, such as for control of other modules or systems of the vehicle control system 100. The control panel includes a touchpad 122 for receiving an input from a user for control of the vehicle control system 100. The touchpad 122 may display virtual buttons that may be touched by the user of the vehicle to control the vehicle control system 100. Additionally or alternatively, the control panel 114 includes other input mechanisms, such as mechanical buttons or other controls (e.g., knobs, switches, etc.) associated with the touchpad 122 to receive inputs for controlling the vehicle control system 100. The control panel 114 may have a dedicated control module or unit configured to process the control inputs and/or to process the data to be displayed on the display device and/or the touchpad 122. Alternatively, such control functions may be processed by the processor 106 (e.g., as part of the controller 118).

The display device 116 may communicate with the processor 106 via a communication line to transmit data to/from the display device 116, such as for display of various information to the user of the vehicle. The display device 116 includes a display screen 124 for displaying information to the user. In one embodiment, the display device 116 is separate from the control panel 114, such as located at a different location in the vehicle. For example, the display screen 124 can be positioned for convenient viewing by the user, and the touchpad 122 can be positioned within a comfortable distance from a hand of the user. The display screen 124 may display different icons, graphics, and the like than the touchpad 122. The virtual buttons on the touchpad 122 may correspond to and/or be mapped to the display icons on the display screen 124. In another embodiment, the display device 116 is the same as or coupled to the control panel 114. For example, the touchpad 122 is combined with the display screen 124, such as via a touchscreen that functions as both an output device and an input device.

Figure 2:
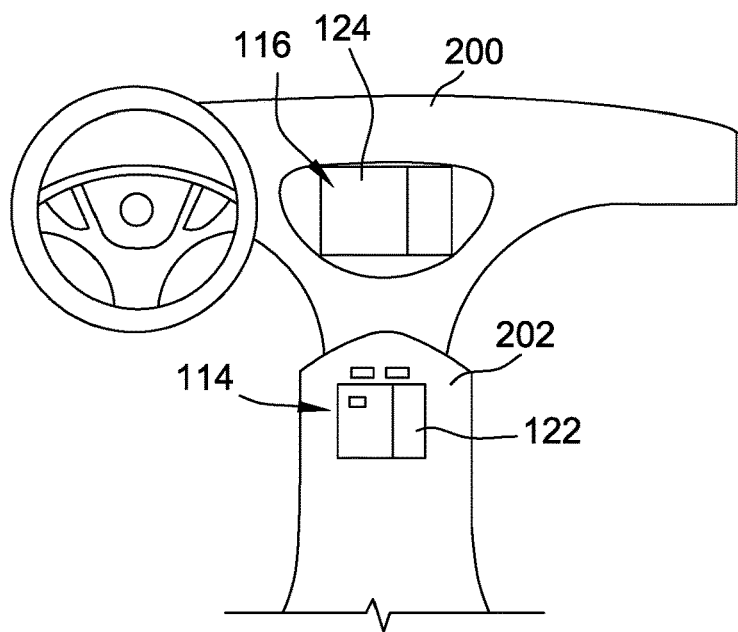
FIG. 2 is a partial schematic view of an exemplary vehicle including the vehicle control system shown in FIG. 1.

FIG. 2 is a partial schematic view of a vehicle (e.g., vehicle 300, shown in FIG. 3) including the vehicle control system 100 in accordance with an exemplary embodiment. The vehicle includes a dashboard 200 and a center console 202. In an exemplary embodiment, the display device 116, including the display screen 124, is positioned at a central portion of the dashboard 200 such that a user, or an operator/driver, of a vehicle may easily view the display screen 124 without being distracted from operating the vehicle. The display screen 124 may be located close to eye level such that the user of the vehicle may view the display screen 124 while being able to peripherally view a roadway ahead. In other embodiments, the display screen 124 may be positioned at another location within the vehicle.

The control panel 114 may be located next to the user of the vehicle. The touchpad 122 is positioned to be easily reachable by the user while operating the vehicle. In some embodiments, the control panel 114 may be located in a center console area next to the user. The touchpad 122 enables the user to select icons displayed on the display screen 124 and associated functions.

The control panel 114 is communicatively coupled to the display device 116, as well as to the various sub-systems of the vehicle control system 100, such as the seat haptic system 110, the vehicle entertainment system 112, and the like. For example, the control panel 114, the display device 116 and the components of the sub-systems may be communicatively coupled to the processor 106 (shown in FIG. 1).

The display device 116 may have a home menu or main menu having display icons corresponding to the various sub-systems, such as the seat haptic system 110. The control panel 114 is used to maneuver through the main menu, such as to activate control of one of the sub-systems. For example, the user may touch the touchpad 122 and navigate to activate the various function modes or sources and/or to activate various function controls associated with the modes or sources. Such activation or execution may be performed by selecting a virtual button on the touchpad 122 associated with one of the display icons to activate control of the mode or source associated with such sub-system.

It should be understood that in other embodiments, the control panel 114 is combined with the display device 116, such that the user interacts with (e.g., touches) the display screen 124 directly to select or otherwise manipulate controls or other content displayed thereon, and that the embodiment of FIG. 2 is illustrative only.

Figure 3:
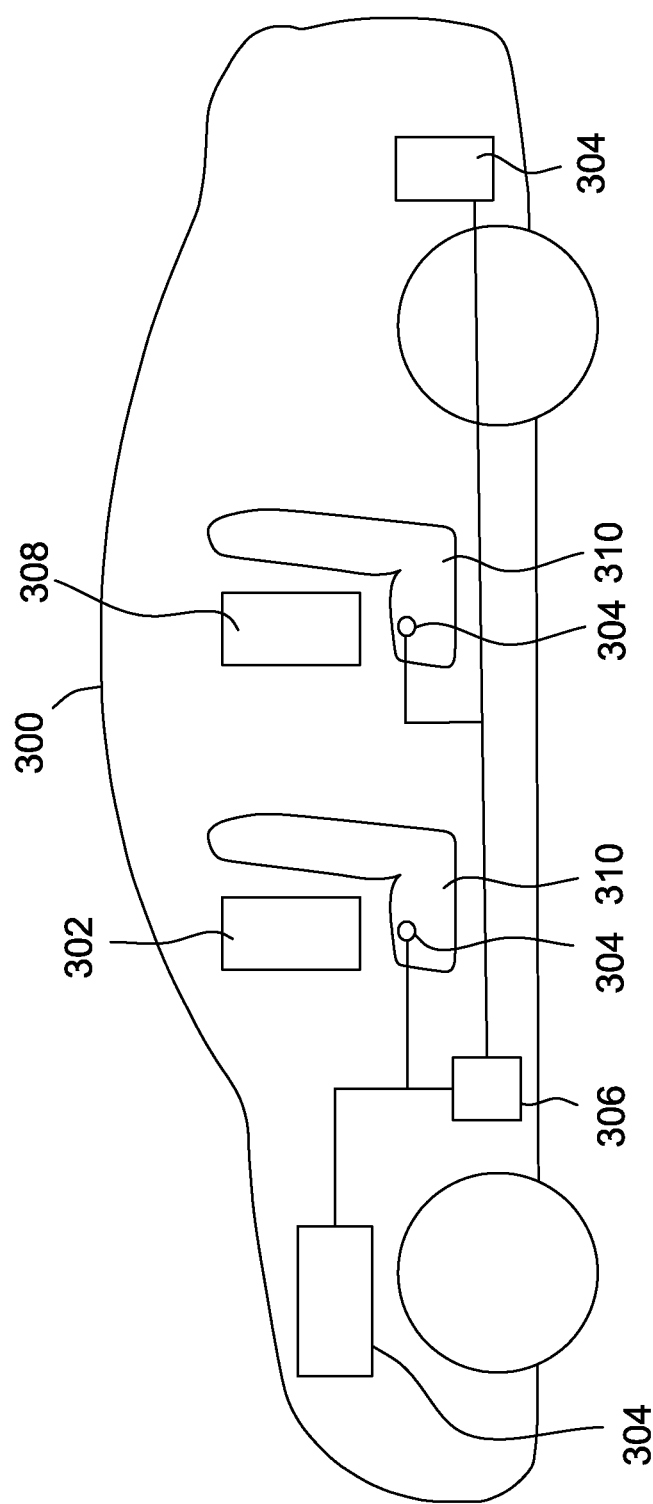
FIG. 3 is a schematic view of an exemplary vehicle including an exemplary seat haptic system.

FIG. 3 is a schematic view of an exemplary vehicle 300 in which the vehicle control system 100 (shown in FIG. 1) may be implemented. While the vehicle 300 may be an automobile in the exemplary embodiment, in other embodiments, the vehicle 300 may be, but is not limited to, other types of ground craft, aircraft, and watercraft vehicles. The vehicle 300, which may be operated by a driver 302, includes a plurality of sensors 304 and a vehicle controller 306 (which may be the same as the controller 118, shown in FIG. 1). The plurality of sensors 304 may detect the presence of the driver 302 and one or more passengers 308 in the vehicle 300. In these embodiments, the plurality of sensors 304 may detect the presence of fastened seatbelts, the weight in each seat in vehicle 300, heat signatures, or any other method of detecting information about the driver 302 and passengers 308 in the vehicle 300. The plurality of sensors 304 may also include sensors that detect conditions of and/or operations performed by the vehicle 300, such as velocity, acceleration, braking, and other conditions related to the operation of the vehicle 300.

In the exemplary embodiment, the vehicle 300 includes a plurality of seats 310, wherein each vehicle seat 310 corresponds to a seating location that may be occupied by a user of the vehicle 300 (i.e., the driver 302 or one or more passengers 308). As described further herein, in the exemplary embodiment, the seat haptic system 110 (shown in FIG. 1) includes a plurality of actuators (not shown in FIG. 3) positioned in each vehicle seat 310. Each of the actuators is independently controllable by the controller 306 to generate a haptic output in each seat 310 in response to various control conditions. At least some vehicle sensors 304 are employed to detect various characteristics of the vehicle 300 and/or one or more users thereof (i.e., the driver 302 and/or one or more passengers 308). The controller 306 receives sensor data and interprets the sensor data to determine an appropriate haptic output at each vehicle seat 310. The controller 306 also receives user input via the control panel 114 (shown in FIGS. 1 and 2) and incorporates user inputs into the determination of the haptic output at each vehicle seat 310. The controller 306 then transmits a control signal to one or more actuators at one or more of the vehicle seats 310. Receiving the control signal causes the corresponding actuator(s) to generate a haptic output as instructed by the control signal.

Figure 4:
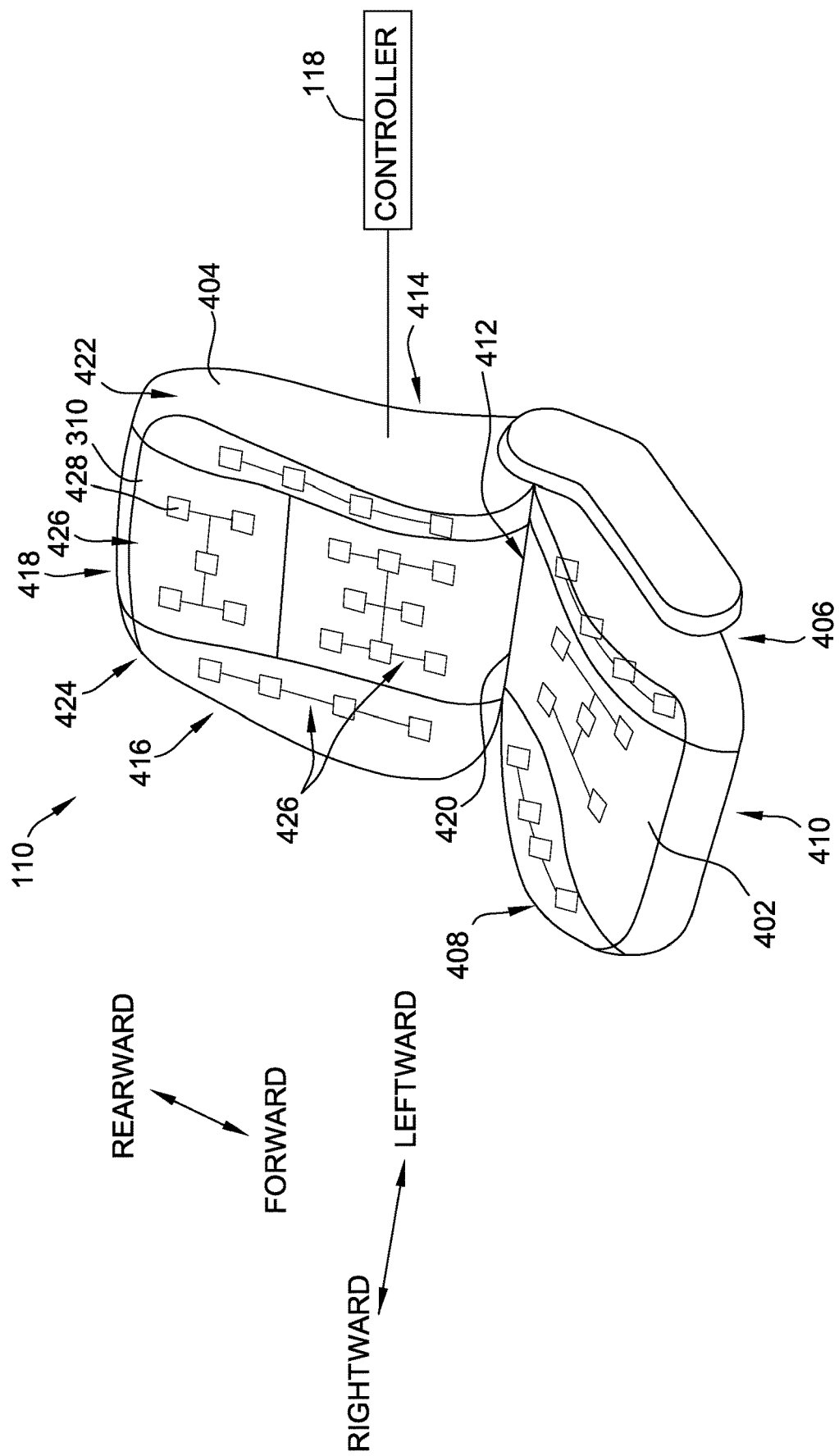
FIG. 4 is a perspective view of an exemplary seat haptic system suitable for use in the vehicle shown in FIG. 3, wherein the seat haptic system includes a vehicle seat.

FIG. 4 is a perspective view of the seat haptic system 110 shown in FIG. 1. The seat haptic system 110 is suitable for use, for example, in the vehicle 300 (shown in FIG. 3). The seat haptic system 110 includes one or more vehicle seats 310 and the controller 118 (shown in FIG. 1, which may be the same as or substantially equivalent to the controller 306 shown in FIG. 3). The controller 118 is located at any suitable location in the vehicle 300, and is communicatively coupled to components of each vehicle seat 310 (e.g., actuators) to transmit control signals thereto. Alternatively, each vehicle seat 310 may include an independent controller 118 communicatively coupled to components thereof and configured to interpret user input and other input data (e.g., audio input data) to generate a control signal for only that vehicle seat 310. The seat haptic system 110 may include a plurality of vehicle seats 310 such as those shown in FIG. 4 (e.g., individual or "bucket" seats), as well as one or more alternative vehicle seats, such as bench seats.

The vehicle seat 310 includes a base 402 and a back 404. In some embodiments, the vehicle seat 310 also includes a head rest (not shown in FIG. 4). The base 402 extends laterally (i.e., from left to right) from a first side 406 to a second side 408, and longitudinally (i.e., from front to back) from a front 410 to a rear 412. Similarly, the back 404 extends laterally from a first side 414 to a second side 416, and vertically from a top 418 to a bottom 420, where the bottom 420 of the back 404 is adjacent to the rear 412 of the base 402. The base first side 406 and back first side 414 collectively define a first side 422 of the seat 310. Similarly, the base second side 408 and back second side 416 collectively define a second side 424 of the seat 310.

A plurality of haptic zones 426 are defined across the seat base 402 and the seat back 404. Each haptic zone 426 includes one or more actuators 428 therein. Each actuator 428 includes an electrical, mechanical, and/or electro-mechanical actuator 428 suitable to generate a haptic output that is discernible by an occupant of the seat 310. The haptic output may include a vibration, a discrete or individual force output, a motion, a combination thereof, and/or any other suitable haptic output. Suitable actuators 428 include, but are not limited to eccentric rotating mass (ERM) actuators, linear resonant actuators, piezoelectric actuators, and/or any combination thereof.

In the illustrated embodiment, the seat back 404 includes four haptic zones 426, and the seat base 402 includes three haptic zones 426. It should be readily understood that, in other embodiments, there may be additional haptic zones 426, fewer haptic zones 426, and/or haptic zones 426 having different dimensions, shapes, orientations, configurations, and/or positions than those shown in FIG. 4 without departing from the scope of the present disclosure. For instance, it is contemplated that a vehicle seat 310 may include haptic zones 426 with respective actuators in armrests, a headrest, a calf area, and/or a foot rest or floor area surrounding the vehicle seat 310 (not shown in FIG. 4).

Each actuator 428 is communicatively coupled to the controller 118 and is independently controllable thereby to generate a haptic output in response to a control signal from the controller 118. Accordingly, certain actuators 428 may be controlled to generate a haptic output, also referred to as "activating" an actuator 428, while one or more other actuators 428 remain "deactivated" or "idle," and do not generate a haptic output.

In the exemplary embodiment, the controller 118 generates the control signal to cause the actuators 428 to generate haptic output having a magnitude that corresponds generally to a volume level of audio content output from the vehicle entertainment system 112 (shown in FIG. 1), as described further herein. Additionally or alternatively, the controller 118 may causes the actuators 428 to activate and/or deactivate to generate the haptic output that corresponds to a frequency of the audio content, a balance (left-to-right) of the audio content, a fade (front-to-back) of the audio content, and/or other characteristics of the audio content (e.g., a level of treble and/or bass).

In addition, as described further herein, the controller 118 receives user input from a user of a vehicle seat 310 that indicates user preferences or settings for the haptic output. The controller 118 incorporates the user settings for a seat 310 in generating the control signal causing the haptic output generated at that seat 310 by the plurality of actuators 428.

Additionally or alternatively, the controller 118 may generate the control signal to cause the actuators 428 to generate the haptic output in response to one or more vehicle operations or conditions of the vehicle 300. For instance, the controller 118 generates the control signal to cause the actuators 428 to generate haptic output indicative of a turn signal operation, a blind spot alert, a lane change operation, an acceleration operation, a braking operation, and/or a backseat load alert (colloquially referred to as "child-in-seat" alert). In some such embodiments, the controller 118 only causes haptic output in response to a vehicle operation to be generated at the driver's vehicle seat 310, as such information may not be relevant to one or more passengers in the vehicle 300. The controller 118 may interrupt a haptic output generated corresponding to the audio output to cause generation of a haptic output corresponding to the vehicle operation(s), at the driver's seat 310, while maintaining the haptic output generated corresponding to the audio output at the vehicle seat(s) 310 of one or more passengers of the vehicle 300.

Figure 5:
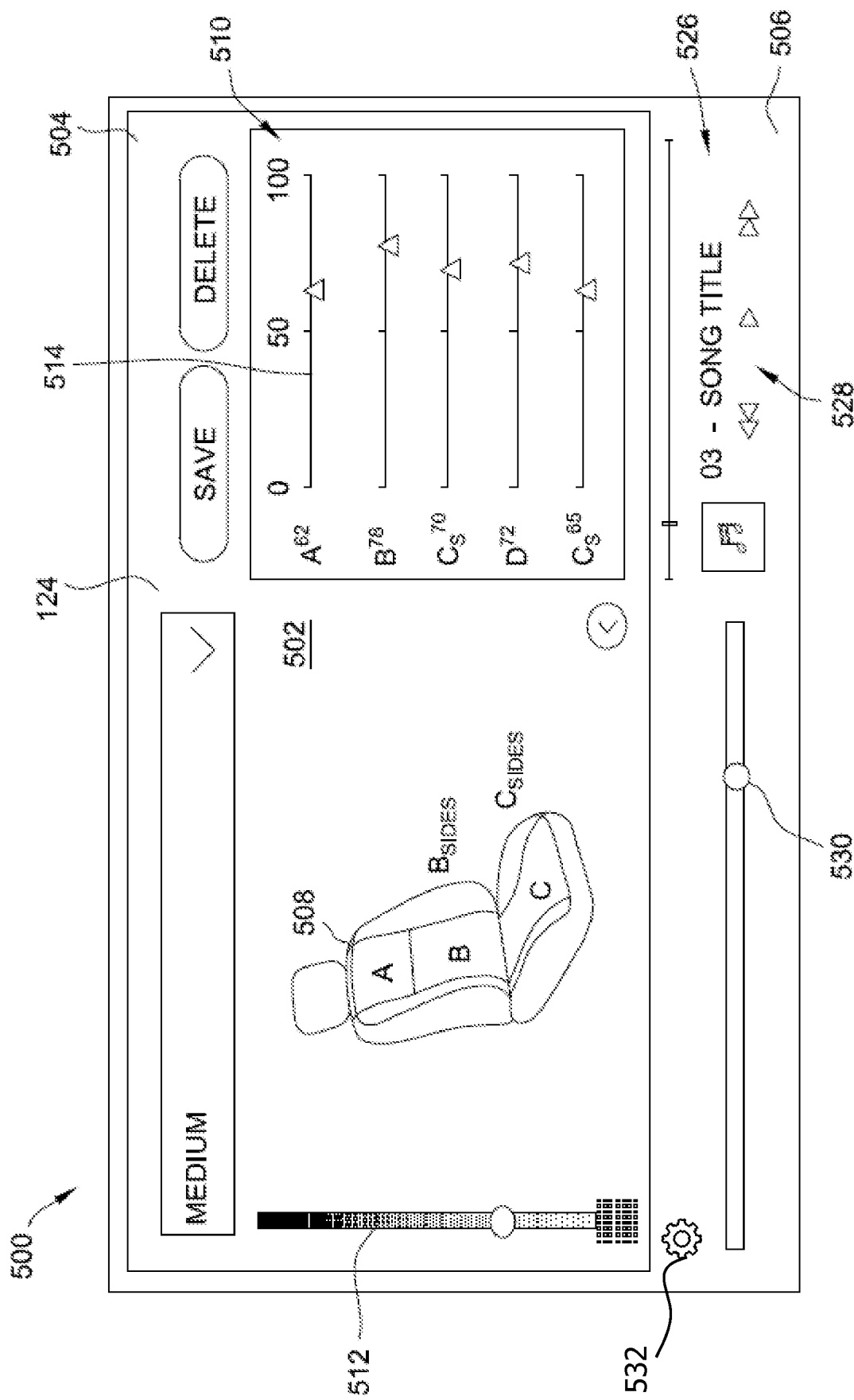
FIG. 5 illustrates a display screen showing an exemplary haptic control interface.

FIG. 5 is a view 500 of an exemplary user interface 502 displayed on the display screen 124 of the vehicle control system 100 shown in FIG. 1. A user of the vehicle 300 (shown in FIG. 3) may input controls, preferences, settings, or other user input data with the user interface 502. In one embodiment, the view 500 is displayed on display screen 124, which is positioned in the dashboard 200 of the vehicle 300, as shown in FIG. 2. Additionally or alternatively, each vehicle seat 310 may have an associated display screen 124 at a location thereby. For instance, each rear vehicle seat 310 may have an associated display screen 124 located in the seat back 404 of the vehicle seat 310 in front of it.

The user interface 502 includes a haptic control portion 504 and a vehicle entertainment control portion 506 (generally, first and second control portions). The haptic control display portion 504 depicts an illustration of a vehicle seat 508 with haptic zones labeled "A", "B", "B$_{sides}$", "C", and "C$_{sides}$". It should be readily understood that the haptic zones 426 on the illustrated vehicle seat 508 may be alternatively labeled without departing from the scope of the present disclosure. Where one display screen 124 is used to input user preferences or settings for a plurality of vehicle seats 310, the displayed illustrated vehicle seat 508 may be labeled or otherwise identified. Each individual vehicle seat may be selected using a drop down list, one or more scrolling controls (e.g., left and right arrows), selecting the seat from an illustration or graphical representation of the vehicle 300 (not shown), or using any other suitable method.

The haptic control portion 504 also includes a plurality of user input controls 510 including a master haptic magnitude control 512 and individual zone haptic magnitude controls 514. The master haptic magnitude control 512 and the individual zone haptic magnitude controls 514 are depicted as slider controls in the exemplary embodiment that can be manipulated by a user to select a preferred overall magnitude of haptic output (e.g., using the master haptic magnitude control 512) and a preferred magnitude of haptic output to be generated at each corresponding haptic zone 426. In the exemplary embodiment, manipulation of the master slider 512 causes a corresponding adjustment in every individual zone slider 514, increasing or decreasing the magnitude of haptic output at all individual zones 426 equally. In other words, as the master slider 512 is moved up or down, all of the individual zone sliders 514 are moved left or right by a corresponding amount.

The user interface 502 may include one or more controls to turn a particular haptic zone 426 on or off. For example, in the illustrated embodiment, individual haptic zones 426 may be turned on or off by a user selecting (e.g., with touchpad 122) one of the haptic zones on the illustration of the selected seat 508 displayed on the user interface 502. A user with lower back pain, for instance, may select the "B" haptic zone to turn that haptic zone off. The controller 118 receives this user input, and generates or otherwise modifies control signals output by the controller 118 to the plurality of actuators 428 such that the actuator(s) 428 in the "B" haptic zone are not activated.

The vehicle entertainment control portion 506 of the user interface 502 includes an indicator 526 of the current audio content playback, audio content manipulation controls 528 (e.g., a play/pause control, a skip control, etc.), and an audio content volume control 530. In the exemplary embodiment, a user may manipulate the audio content volume control 530 to adjust the volume level of audio content output in a location corresponding to their vehicle seat 310. Where the user interface 502 is displayed to the driver (e.g., in the dashboard 200 of the vehicle 300), manipulation of the audio content volume control 530 may cause the volume level throughout the vehicle 300 to change accordingly. In other words, such a control may be a "master" volume control 530.

Figure 6:
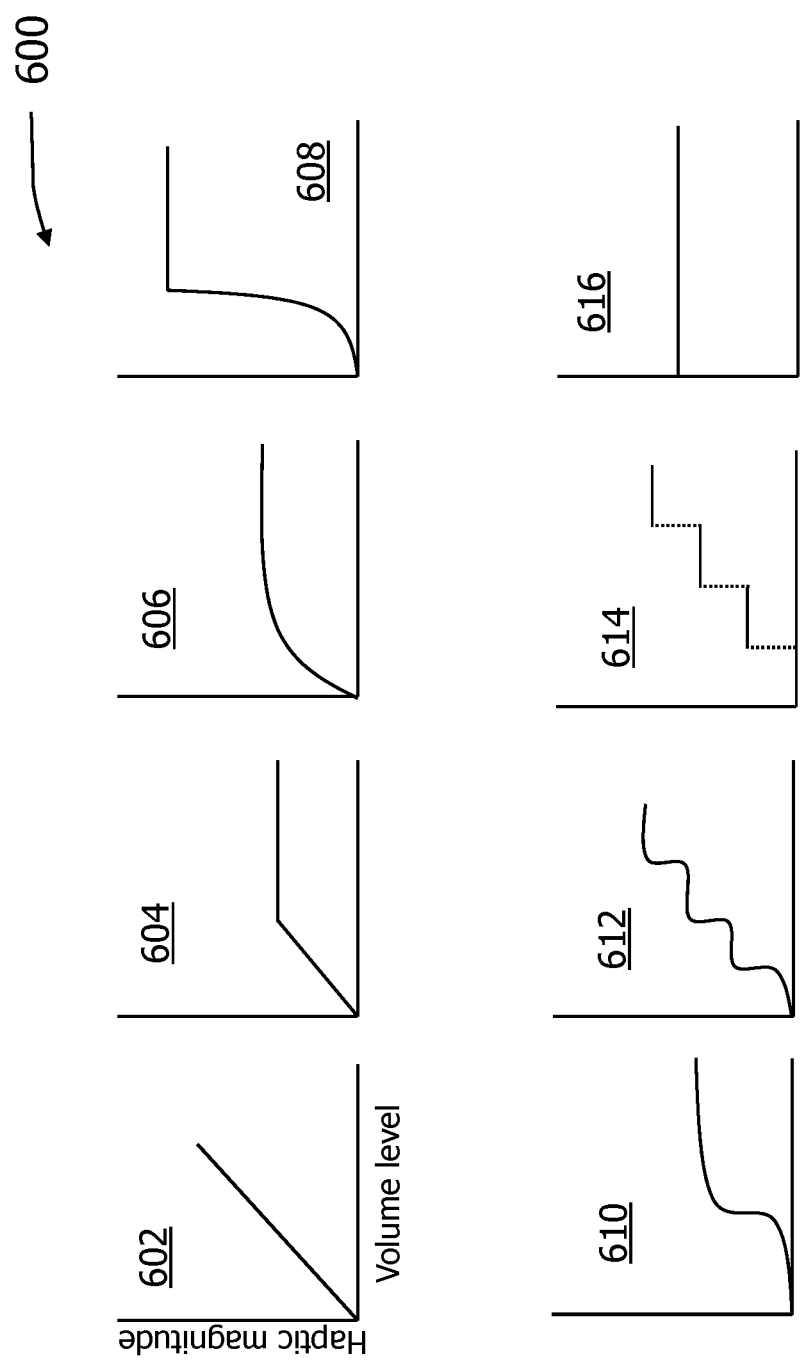
FIG. 6 illustrates exemplary relationships between a volume level of audio content and a magnitude of haptic output generated by the seat haptic system shown in FIG. 4.

In the exemplary embodiment, the magnitude of the haptic output at an individual seat 310 (and/or at all vehicle seats 310 in vehicle 300) is associated with the volume level of the audio content output at that vehicle seat 310 (and/or generally within vehicle 300). In various embodiments, the relationship between the magnitude of the haptic output and the volume level of the audio content may vary. FIG. 6 illustrates a plurality of graphs 600 showing exemplary relationships between an output volume level (x-axis) and a magnitude of haptic output from actuators 428 (y-axis). A first graph 602 illustrates a linear relationship between volume level and haptic output. The linear relationship may be a one-to-one relationship, such that a volume level increase of a certain amount is associated with a haptic output magnitude increase of the same relative amount. The linear relationship may be any other linear relationship.

A second graph 604 illustrates a linear, capped relationship between volume level and haptic output. More particularly, the volume level and haptic output have a linear relationship until a maximum haptic output magnitude (a "cap") is reached. A third graph 606 illustrates a non-linear, capped relationship between volume level and haptic output. More particularly, the magnitude of the haptic output increases non-linearly and gradually with respect to volume level until a maximum haptic output magnitude is reached. A fourth graph 608 illustrates a high-intensity, non-linear relationship between volume level and haptic output. Specifically, the haptic output magnitude increases quickly as the volume level is increased, until a maximum haptic output magnitude is reached. A fifth graph 610 illustrates another non-linear relationship between volume level and haptic output. The haptic output magnitude increases gradually as the volume level increases, until a threshold volume level is reached, at which point the haptic output magnitude quickly increases in a step-wise fashion. Any subsequent increases in volume level may cause another gradual, non-linear increase in haptic output magnitude, for example, until a maximum haptic output magnitude is reached. A sixth graph 612 illustrates another non-linear, step-wise relationship between volume level and haptic output, and a seventh graph 614 illustrates another step-wise relationship between volume level and haptic output. Any maximum magnitude and/or threshold volume level(s) may be selected by a user or may be automatically set by controller 118. An eighth graph 616 illustrates a situation in which there is no relationship between volume level and haptic output, such that the magnitude of the haptic output is the same no matter the volume level of the audio content.

Figure 7:
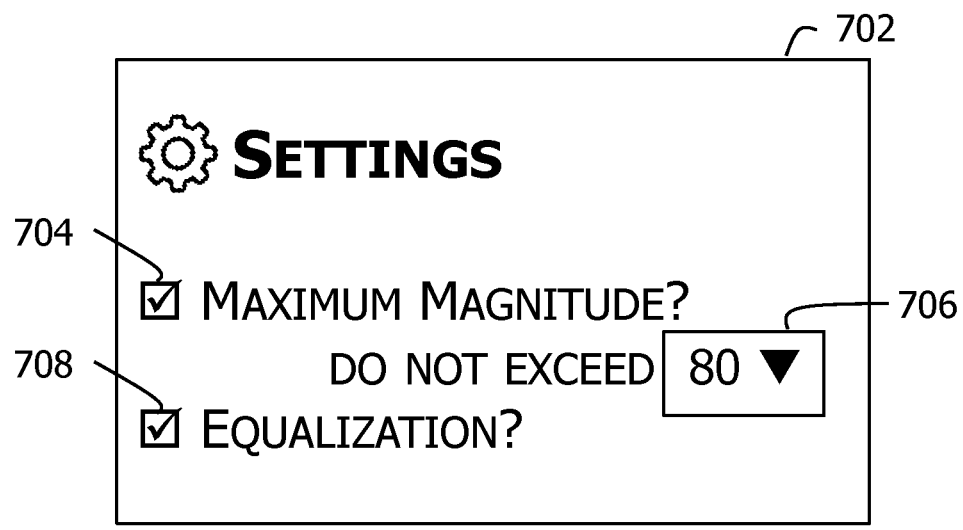
FIG. 7 illustrates a display screen showing exemplary haptic control settings.

With reference to FIGS. 5 and 7, the vehicle entertainment control portion 506 of the user interface 502 also includes a settings control 532 that, upon selection by a user, causes display of a settings menu 702 (shown in FIG. 7). In the illustrated embodiment, the settings menu 702 includes additional settings associated with how the controller 118 controls the actuators 428 to generate the haptic output based on the audio content being output by the vehicle entertainment system 112 (shown in FIG. 1). For example, a user may select an option 704 to impose a maximum magnitude of the haptic output, and may use a drop-down menu 706 (or any other suitable control, such as a text entry field) to set the maximum magnitude. The maximum magnitude of the haptic output may be represented and/or interpreted by the controller 118 as a relative value, as shown. Additionally or alternatively, the maximum magnitude may be represented and/or interpreted by controller 118 as a maximum current supplied to the actuators 428 to generate the haptic output. A user may select an option 708 to equalize the haptic output as the audio content is switched (e.g., between songs, between radio stations, between sources, etc.), as described further herein.

Figure 8:
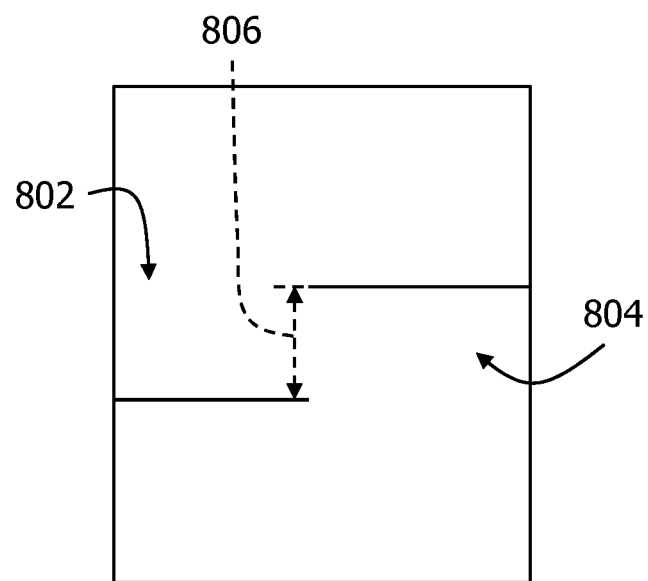
FIG. 8 is a schematic diagram of exemplary waveforms representative of volume levels of first and second audio content.

FIG. 8 is a schematic diagram of waveforms of first and second audio content to be output by the vehicle entertainment system 112. More specifically, first audio content is represented as a first waveform 802. The magnitude of the first waveform 802, in turn, is representative of a relative volume level of the first audio content (a "first volume level"). Second audio content is represented as a second waveform 804. The magnitude of the second waveform 804 is representative of a relative volume level of the second audio content (a "second volume level"). First and second audio content may include, for example, first and second songs, first and second channels (e.g., radio channels), or audio content from first and second sources (e.g., the radio and a remote device, respectively).

As described herein, the controller 118 is configured to control the actuators 428 to generate a haptic output having a magnitude associated with the volume level of the first and second audio content. More specifically, when the first audio content is being output by the vehicle entertainment system 112, the controller 118 controls the actuators 428 to generate a first haptic output associated with the first audio content, the first haptic output having a first magnitude associated with or corresponding to the first volume level. When the second audio content is being output by the vehicle entertainment system 112, the controller 118 controls the actuators 428 to generate a second haptic output associated with the second audio content, the second haptic output having a second magnitude associated with or corresponding to the second volume level.

In the illustrated embodiment, a difference 806 is defined between the first and second waveforms 802, 804. Specifically, difference 806 is defined between an end of the first waveform 802 (e.g., when first audio content is ending or the output thereof from vehicle entertainment system 112 is ended) and a beginning of the second waveform 804 (e.g., when second audio content is beginning or the output thereof from the vehicle entertainment system 112 is initiated). When the difference 806 is relatively large, a corresponding difference between the first and second magnitudes of the first and second haptic outputs can be drastic, which may adversely impact a user's enjoyment of the seat haptic system 110.

Figure 9:
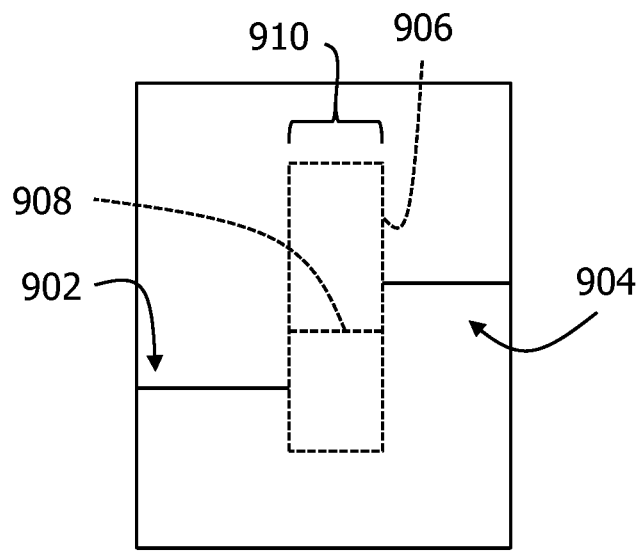
FIGS. 9-11 are schematic diagrams of exemplary waveforms representative of haptic output magnitudes corresponding to the first and second audio content of FIG. 8, and an equalization algorithm implemented by the seat haptic system shown in FIG. 4.
Figure 10:
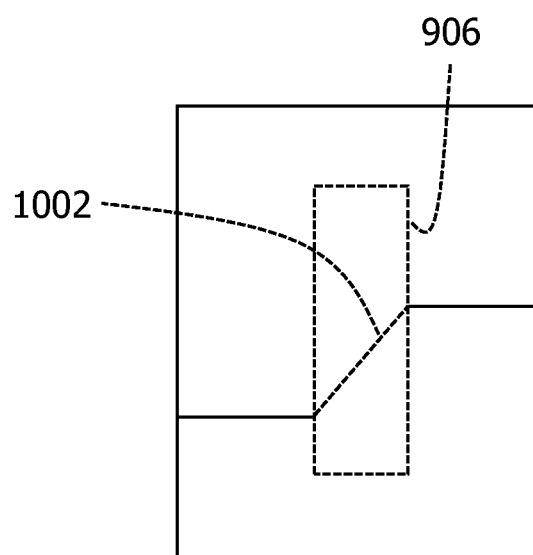
Figure 11:
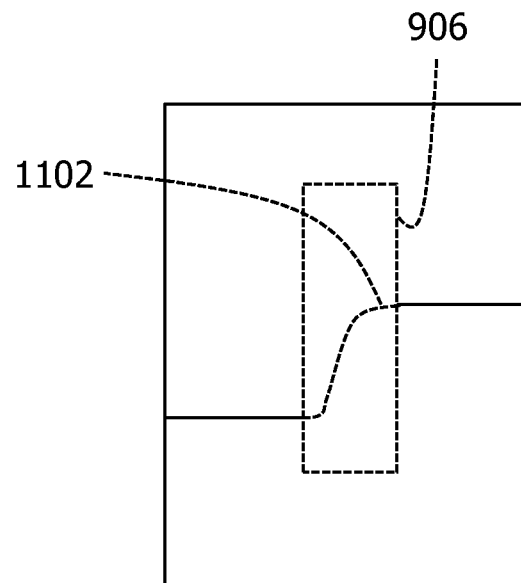

In the exemplary embodiment, the controller 118 is configured to equalize the haptic output generated at a vehicle seat 310. Specifically, the controller 118 is configured to control the actuators 428 to generate an equalized or transitional haptic output based on a difference between the first volume level of the first audio content and the second volume level of the second audio content. FIGS. 9-11 are schematic diagrams of waveforms representative of magnitudes of haptic outputs corresponding to the first and second audio content. Specifically, the first haptic output generated by the actuators 428 (in response to a control signal from the controller 118) is represented as a first waveform 902. The magnitude of the first waveform 902, in turn, is representative of a relative magnitude of the first haptic output (a "first magnitude"). The first magnitude is associated with the first volume level of the first audio content. The second haptic output is represented as a second waveform 904. The magnitude of the second waveform 904 is representative of a relative magnitude of the second haptic output (a "second magnitude"). The second magnitude is associated with the second volume level of the second audio content.

As shown in FIGS. 9-11, the controller 118 is configured to execute an equalization algorithm 906, and to generate a transitional haptic output based on the output of the equalization algorithm 906, to limit a difference in magnitude between the first haptic output and the second haptic output. In particular, the controller 118 executes the equalization algorithm 906 to equalize the magnitude of the haptic output generated by the actuators 428 when playback of the first audio content ends and the second audio content begins. The controller 118 controls the actuators 428 to generate the transitional haptic output after the first haptic output (associated with the first audio content) and before the second haptic output (associated with the second audio content).

The controller 118 is configured to generate the first and second haptic outputs based on the first and second audio content. The controller 118 may receive or retrieve the first and second audio content as data signals (e.g., as data signals represented as waveforms 802, 804) for processing. For example, the controller 118 (or another centralized processor communicatively coupled thereto) receives the first audio content as a first audio input signal. The controller 118 processes the first audio input signal to determine the first volume level of the first audio content. The first volume level may be defined in metadata of the first audio input signal. Additionally or alternatively, the controller 118 processes the first waveform 802 associated with the first audio content to determine the first volume level. In some embodiments, the controller 118 processes the first audio input signal prior to the first audio content being output by the vehicle entertainment system 112, and stores the first volume level (e.g., in the memory 102, shown in FIG. 1) associated with the first audio content.

The controller 118 is further configured to receive the second audio content as a second audio input signal. The controller 118 processes the second audio input signal to determine the second volume level of the second audio content. The second volume level may be defined in metadata of the second audio input signal. Additionally or alternatively, the controller 118 processes the second waveform 804 associated with the second audio content to determine the second volume level. In some embodiments, the controller 118 processes the second audio input signal prior to the second audio content being output by the vehicle entertainment system 112, and stores the second volume level (e.g., in the memory 102) associated with the second audio content.

To generate the transitional haptic output, the controller 118 is configured to retrieve the equalization algorithm 906 (e.g., from the memory 102) for execution based on the first and second volume levels. The controller 118 is additionally or alternatively configured to generate the equalization algorithm 906 each time the equalization algorithm 906 is to be executed. In some embodiments, the controller 118 only executes the equalization algorithm 906 when the difference 806 between the first and second volume levels exceeds a threshold value. The controller 118 may automatically determine or define the threshold value, or the threshold value may be input by a user (e.g., using user interface 502, shown in FIG. 5). The controller 118 executes the equalization algorithm 906 and controls the actuators 428 to generate an equalized haptic output based on the output from the equalization algorithm 906. For example, the controller 118 incorporates the output from the equalization algorithm 906 into a control signal, and transmits the control signal to the actuators 428.

As shown in FIG. 9, in some embodiments, the equalization algorithm 906 outputs an average 908 of the first magnitude of the first haptic output and the second magnitude of the second haptic output. Accordingly, the controller 118 controls the actuators 428 to generate a transitional or equalized haptic output having a magnitude corresponding to the average 908 of the first and second magnitudes.

As shown in FIG. 10, in some embodiments, the equalization algorithm 906 outputs a linear function 1002 that defines a slope between the first magnitude of the first haptic output and the second magnitude of the second haptic output. Accordingly, the controller 118 controls the actuators 428 to generate transitional haptic output having a magnitude that increases linearly as a function of time, according to the linear function 1002, from the first magnitude to the second magnitude. It should be readily understood that in situations in which the second volume level is less than the first volume level, the varying magnitude decreases according to a linear function output from the equalization algorithm 906.

As shown in FIG. 11, in some embodiments, the equalization algorithm 906 outputs a nonlinear function 1102 that defines a curved and/or gradual transition between the first magnitude of the first haptic output and the second magnitude of the second haptic output. Accordingly, the controller 118 controls the actuators 428 to generate an equalized haptic output having a magnitude that increases nonlinearly as a function of time, according to the nonlinear function 1102, from the first magnitude to the second magnitude. It should be readily understood that in situations in which the second volume level is less than the first volume level, the varying magnitude decreases according to a nonlinear function output from the equalization algorithm 906. Moreover, it should be readily understood that the equalization algorithm 906 may output any suitable function that facilitates a transition between the first and second magnitudes.

The controller 118 controls the actuators 428 to generate the second output associated with the second audio content following the transitional haptic output. In some embodiments, the controller 118 controls the actuators 428 to generate the transitional haptic output and to generate the second haptic output associated with the second audio content using the same control signal. In other embodiments, the controller 118 controls the actuators 428 to generate the transitional haptic output and to generate the second haptic output using two consecutive control signals.

In some embodiments, the equalization algorithm 906 further defines a period of time 910 (see FIG. 9) over which the transitional haptic output is generated. The period of time 910 may include one second, two seconds, five seconds, or any other suitable period of time than enables a more comfortable transition between the first and second magnitudes of haptic output corresponding to the first and second volume levels of the first and second audio content, respectively.

In some embodiments, the controller 118 is additionally or alternatively configured to generate the transitional haptic output by limiting an amount of current supplied to the actuators 428 such that the amount of current supplied to the actuators 428 does not exceed a maximum current limit. The maximum current limit, as described above, may be input by a user using drop-down menu 706 (shown in FIG. 7). Additionally or alternatively, the controller 118 may define the maximum current limit, or the controller 118 may be preprogrammed with the maximum current limit (e.g., the maximum current limit may be saved in the memory 102).

Figure 12:
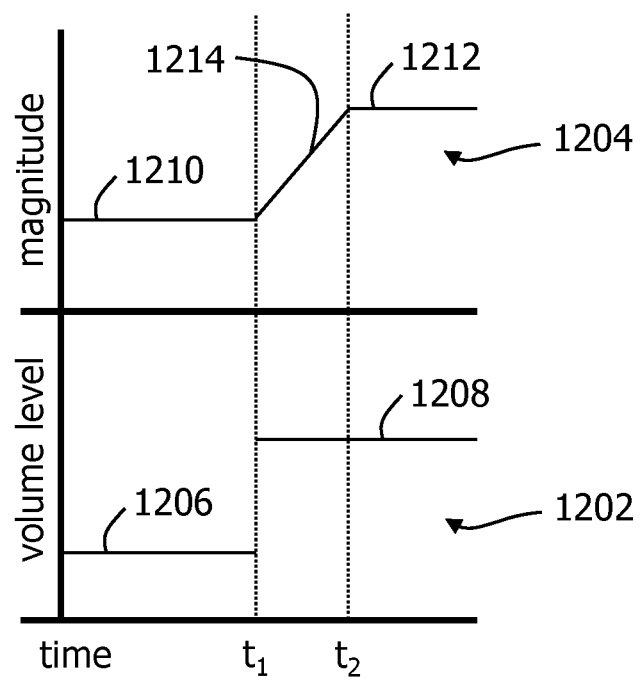
FIG. 12 illustrates an exemplary temporal relationship between audio content and haptic output.

FIG. 12 illustrates an exemplary temporal relationship between audio content 1202 and haptic output 1204. First audio content is represented as a first waveform 1206, and second audio content is represented as a second waveform 1208. The first audio content is output by the vehicle entertainment system 112 (shown in FIG. 1) until an end time $t_1$, at which time the second audio content is output.

A first haptic output (associated with the first audio content) is represented as a third waveform 1210, and a second haptic output (associated with the second audio content) is represented as a fourth waveform 1212. In additional, a transitional haptic output between the first and second haptic outputs is represented as a fifth waveform 1214. As described above, the transitional haptic output provides a transition between the first and second haptic outputs. Notably, the first haptic output is generated by the actuators 428 (shown in FIG. 4) until the end time $t_1$. The transitional haptic output is generated until a time $t_2$ (e.g., for the period of time 910, shown in FIG. 9), at which time the second haptic output is generated.

In some embodiments, the controller 118 (shown in FIG. 1) may control the actuators 428 to initiate generation of the transitional haptic output before $t_1$, and may control the actuators 428 to initiate generation of the second haptic output at $t_2$. In other embodiments, the controller 118 may control the actuators 428 to initiate generation of the transitional haptic output before $t_1$, and may control the actuators 428 to initiate generation of the second haptic output before $t_2$.

Accordingly, it should be understood that generation of the first haptic output and/or the second haptic output may be offset from output of the first audio content and/or the second audio content, respectively, as a result of the generation of the transitional haptic output.

Figure 13:
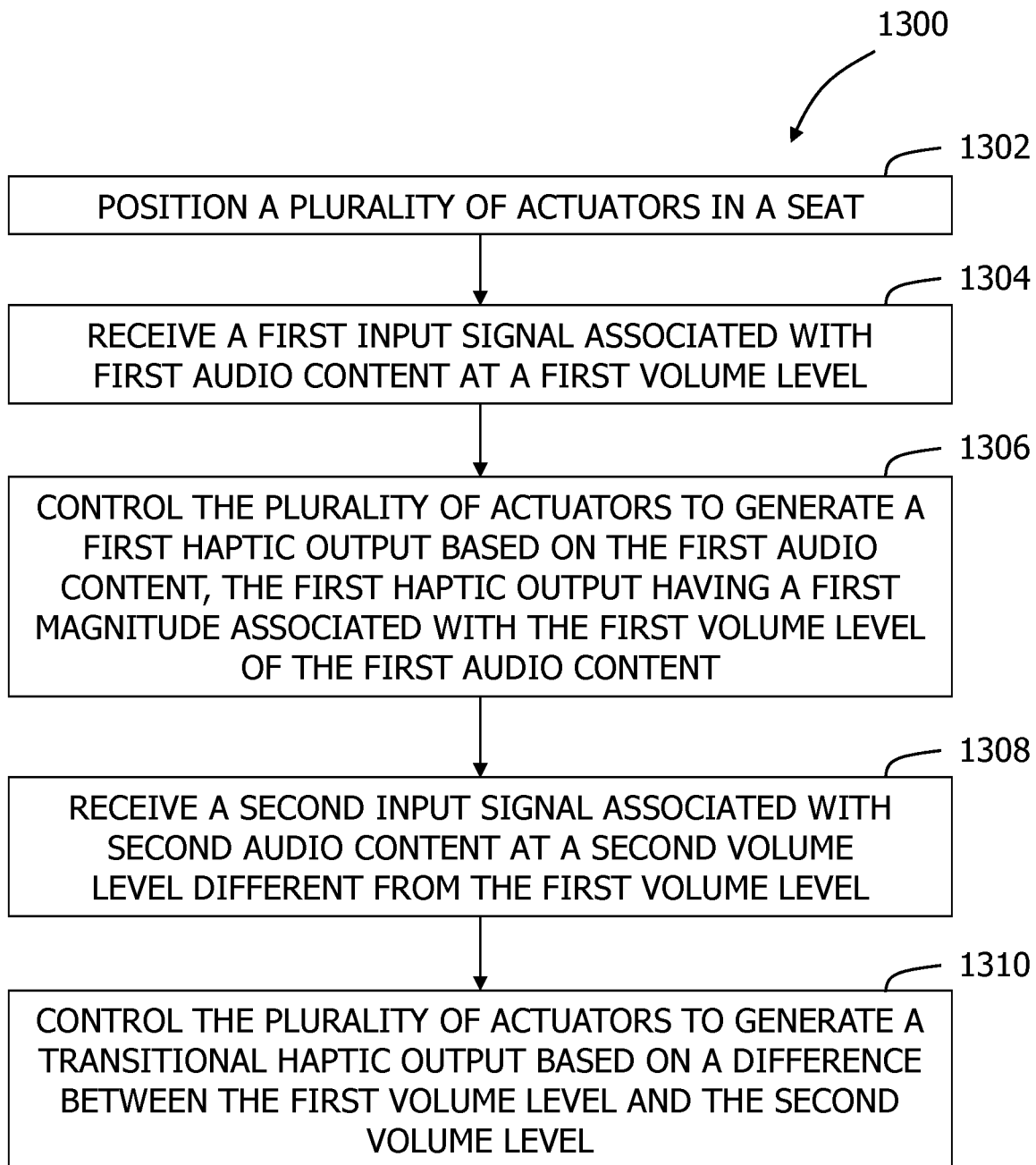
FIG. 13 is a flow chart of an exemplary method of generating a haptic output at the vehicle seat shown in FIG. 4.

FIG. 13 is a flow chart of an exemplary method 1300 for generating a haptic output in a vehicle seat. In the exemplary embodiment, aspects of the method 1300 are performed by the controller 118 (shown in FIG. 1).

In the exemplary embodiment, the method 1300 includes positioning 1302 a plurality of actuators (e.g., the actuators 428, shown in FIG. 4) in a seat (e.g., a vehicle seat such as the vehicle seat 310, shown in FIGS. 3 and 4).

The method 1300 also includes receiving 1304 a first input signal associated with first audio content at a first volume level. The method 1300 includes controlling 1306 the plurality of actuators to generate a first haptic output based on the first audio content, the first haptic output having a first magnitude associated with the first volume level of the first audio content.

The method 1300 also includes receiving 1308 a second input signal associated with second audio content at a second volume level different from the first volume level. The method 1300 further includes controlling 1310 the plurality of actuators to generate a transitional haptic output based on a difference between the first volume level and the second volume level.

It should be readily understood that the method 1300 may include additional, fewer, and/or alternative steps. For example, in some embodiments, method 1300 further includes controlling the actuators to generate a second haptic output based on the second audio content, following the transitional haptic output, the second haptic output having a second magnitude associated with the second volume level of the second audio content, wherein the transitional haptic output has a magnitude between the first and second magnitudes. The magnitude of the transitional haptic output may be an average of the first magnitude and the second magnitude, may change linearly as a function of time between the first magnitude and the second magnitude, or may change nonlinearly as a function of time between the first magnitude and the second magnitude.

In some embodiments, the method 1300 further includes determining that the difference between the first volume level and the second volume level is greater than a threshold value, and controlling 1310 the plurality of actuators to generate the transitional haptic output based on the determination.

In some embodiments, the method 1300 further includes processing the first input signal to determine the first volume level of the first audio content, and processing the second input signal to determine the second volume level of the second audio content. The method 1300 may further includes processing the second input signal prior to the second audio content being output by a vehicle entertainment system communicatively coupled to the controller.

In some embodiments, controlling 1310 further includes controlling the actuators to generate the transitional haptic output by limiting an amount of current supplied to the plurality of actuators such that the amount of current supplied to the plurality of actuators does not exceed a maximum current limit.

In some embodiments, the method 1300 further includes executing an equalization algorithm to determine a magnitude of the transitional haptic output.

Embodiments of the seat haptic systems described herein facilitate increasing the flexibility of haptic output provided to a user, and improving a user experience of the haptic output. Specifically, the seat haptic system facilitates generating haptic output with a variety of relationships to a volume level, and equalizing the haptic output when a difference in volume levels between first and second audio content is relatively large. Equalizing the haptic output between first and second audio content avoids sudden, large changes in haptic output, thereby improving user experience with seat haptic systems.

The methods and system described herein may be implemented using computer programming or engineering techniques including computer software, firmware, hardware, or any combination or subset. Some technical problems with known systems include (a) a need to facilitate communicating information effectively a user, such as a driver; (b) a need to increase variability in haptic outputs in response to various control conditions; and (c) user discomfort when a difference in volume levels between first and second audio content is significant such that the haptic output varies dramatically and suddenly. Embodiments of the systems and methods described herein address such technical problems. The technical effect of at least some embodiments of the systems and processes described herein is achieved by performing at least one of the following steps: (a) positioning a plurality of actuators in a vehicle seat; (b) receiving a first input signal associated with first audio content having a first volume level; (c) controlling the plurality of actuators to generate a first haptic output based on the first audio content, the first haptic output having a first magnitude associated with the first volume level of the first audio content; (d) receiving a second input signal associated with second audio content having a second volume level different from the first volume level; and (e) controlling the plurality of actuators to generate a transitional haptic output based on a difference between the first volume level and the second volume level. The resulting technical effect is that the difference in haptic output magnitude is limited, improving the user experience of the haptic output.

One or more embodiments include a system, which may be implemented as a programmable logic controller (PLC), also referred to as a programmable logic circuit or simply "controller," that controls various functions and operations of the vehicle, such as a seat haptic system, a vehicle entertainment system, and the like. The controller may control display functions on one or more display devices or screens. The controller may monitor, receive, detect, interpret, and/or transmit one or more inputs or outputs between a display device and a control panel. Moreover, the controller may receive, detect, monitor, and/or transmit signals from other components of the vehicle control system, including sensors and actuators.

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A seat haptic system comprising:
a seat comprising a plurality of actuators configured to generate a haptic output; and
a controller comprising a processor and a memory, said controller communicatively coupled to said plurality of actuators, wherein said controller is configured to:
receive a first input signal associated with first audio content at a first volume level;
control said plurality of actuators to generate a first haptic output based on the first audio content, the first haptic output having a first magnitude associated with the first volume level of the first audio content;
receive a second input signal associated with second audio content at a second volume level different from the first volume level;
control said plurality of actuators to generate a transitional haptic output based on a difference between the first volume level and the second volume level; and
control said plurality of actuators to generate a second haptic output based on the second audio content, following the transitional haptic output, the second haptic output having a second magnitude associated with the second volume level of the second audio content,
wherein the transitional haptic output has a magnitude between the first and second magnitudes.

2. The seat haptic system of claim 1, wherein the magnitude of the transitional haptic output is an average of the first magnitude and the second magnitude.

3. The seat haptic system of claim 1, wherein the magnitude of the transitional haptic output changes linearly as a function of time between the first magnitude and the second magnitude.

4. The seat haptic system of claim 1, wherein the magnitude of the transitional haptic output changes nonlinearly as a function of time between the first magnitude and the second magnitude.

5. The seat haptic system of claim 1, wherein said controller is further configured to:
determine that the difference between the first volume level and the second volume level is greater than a threshold value; and
control said plurality of actuators to generate the transitional haptic output based on the determination.

6. The seat haptic system of claim 1, wherein said controller is further configured to:
process the first input signal to determine the first volume level of the first audio content; and
process the second input signal to determine the second volume level of the second audio content.

7. The seat haptic system of claim 6, wherein said controller is further configured to process the second input signal prior to the second audio content being output by a vehicle entertainment system communicatively coupled to said controller.

8. The seat haptic system of claim 1, wherein said controller is configured to generate the transitional haptic output by limiting an amount of current supplied to said plurality of actuators such that the amount of current supplied to said plurality of actuators does not exceed a maximum current limit.

9. The seat haptic system of claim 1, wherein said controller is further configured to execute an equalization algorithm to determine a magnitude of the transitional haptic output.

10. A vehicle haptic system comprising:
a plurality of actuators configured to generate a haptic output; and
a controller comprising a processor and a memory, said controller communicatively coupled to said plurality of actuators, wherein said controller is configured to:
receive a first input signal associated with first audio content at a first volume level;
control said plurality of actuators to generate a first haptic output based on the first audio content, the first haptic output having a first magnitude associated with the first volume level of the first audio content;
receive a second input signal associated with second audio content at a second volume level different from the first volume level;
control said plurality of actuators to generate a transitional haptic output based on a difference between the first volume level and the second volume level; and
control said plurality of actuators to generate a second haptic output based on the second audio content, the second haptic output having a second magnitude associated with the second volume level of the second audio content,
wherein the transitional haptic output has a magnitude between the first and second magnitudes.

11. The vehicle haptic system of claim 10, wherein the magnitude of the transitional haptic output is an average of the first magnitude and the second magnitude.

12. The vehicle haptic system of claim 10, wherein the magnitude of the transitional haptic output changes one of linearly and nonlinearly as a function of time between the first magnitude and the second magnitude.

13. The vehicle haptic system of claim 10, wherein said controller is further configured to:
determine that the difference between the first volume level and the second volume level is greater than a threshold value; and
control said plurality of actuators to generate the transitional haptic output based on the determination.

14. The vehicle haptic system of claim 10, wherein said controller is further configured to:
process the first input signal to determine the first volume level of the first audio content; and
process the second input signal to determine the second volume level of the second audio content.

15. The vehicle haptic system of claim 14, wherein said controller is further configured to process the second input signal prior to the second audio content being output by a vehicle entertainment system communicatively coupled to said controller.

16. A method of generating a haptic output in a seat haptic system including a plurality of actuators positioned within a seat, said method comprising:
   receiving, by a controller communicatively coupled to the plurality of actuators, a first input signal associated with first audio content at a first volume level;
   controlling, by the controller, the plurality of actuators to generate a first haptic output based on the first audio content, the first haptic output having a first magnitude associated with the first volume level of the first audio content;
   receiving, by the controller, a second input signal associated with second audio content at a second volume level different from the first volume level;
   controlling, by the controller, the plurality of actuators to generate a transitional haptic output based on a difference between the first volume level and the second volume level; and
   controlling, by the controller, the plurality of actuators to generate a second haptic output based on the second audio content, the second haptic output having a second magnitude associated with the second volume level of the second audio content,
   wherein the transitional haptic output has a magnitude between the first and second magnitudes.

17. The method of generating a haptic output of claim 16, further comprising:
   processing, by the controller, the first input signal to determine the first volume level of the first audio content; and
   processing, by the controller, the second input signal to determine the second volume level of the second audio content.

18. The method of generating a haptic output of claim 17, further comprising:
   processing, by the controller, the second input signal prior to the second audio content being output by a vehicle entertainment system communicatively coupled to the controller.

* * * * *